(12) United States Patent
Mayer et al.

(10) Patent No.: US 10,018,319 B2
(45) Date of Patent: Jul. 10, 2018

(54) METHOD FOR DETERMINING THE ZERO POSITION OF A MIRROR DEVICE OF A VEHICLE HEADLIGHT

(71) Applicant: ZKW Group GmbH, Wieselburg (AT)

(72) Inventors: Peter Mayer, Neumarkt an der Ybbs (AT); Thomas Mitterlehner, Mank (AT)

(73) Assignee: ZKW GROUP GMBH, Wieselburg (AT)

(*) Notice: Subject to any disclaimer, the term of this patent is extended or adjusted under 35 U.S.C. 154(b) by 0 days.

(21) Appl. No.: 15/544,070

(22) PCT Filed: Jan. 24, 2017

(86) PCT No.: PCT/AT2017/060008
§ 371 (c)(1),
(2) Date: Jul. 17, 2017

(87) PCT Pub. No.: WO2017/132714
PCT Pub. Date: Aug. 10, 2017

(65) Prior Publication Data
US 2018/0135824 A1      May 17, 2018

(30) Foreign Application Priority Data
Feb. 5, 2016   (AT) .................. 50075/2016

(51) Int. Cl.
*F21S 41/675*  (2018.01)
*F21S 41/657*  (2018.01)
(Continued)

(52) U.S. Cl.
CPC ............ *F21S 41/675* (2018.01); *F21S 41/24* (2018.01); *F21S 41/36* (2018.01); *F21S 41/40* (2018.01); *F21S 41/657* (2018.01); *F21S 41/285* (2018.01)

(58) Field of Classification Search
CPC .......... F21S 41/675; F21S 41/24; F21S 41/36; F21S 41/40; F21S 41/657; F21S 41/285
See application file for complete search history.

(56) References Cited

U.S. PATENT DOCUMENTS 5,938,319 A * 8/1999 Hege .................. B60Q 1/00
362/459
2009/0015388 A1 * 1/2009 Yagi ................. B60Q 1/0035
340/435

(Continued)

FOREIGN PATENT DOCUMENTS

DE         19737653 A1    3/1999
DE     102014001201 A1    7/2015

(Continued)

OTHER PUBLICATIONS

Office Action issued Austrian application No. A 50075 12016, completed Jan. 12, 2017 (4 pages).

(Continued)

*Primary Examiner* — Mary Ellen Bowman
(74) *Attorney, Agent, or Firm* — Eversheds Sutherland (US) LLP

(57) ABSTRACT

In order to determine a zero position of the actuating drive (14) of a luminous range adjustment of a light module (10) in a headlamp for vehicles, light coming from the light source (1) is directed onto an absorber surface (12). The absorber surface (12) has an opening, through which light passes as a delimited light beam (17). By means of the actuating drive (14), the light module (10) is pivoted in terms of its angle position, an intensity of the light beam (17) passing through the opening being detected by means of a light-sensitive sensor (15) which is arranged behind the absorber surface (12).

12 Claims, 2 Drawing Sheets

(51) Int. Cl.
*F21S 41/24* (2018.01)
*F21S 41/40* (2018.01)
*F21S 41/36* (2018.01)
*F21S 41/20* (2018.01)

(56) References Cited

U.S. PATENT DOCUMENTS

2017/0198877 A1* 7/2017 Suwa .................. F21S 48/1291
2018/0003357 A1* 1/2018 Park ........................ F21S 41/16

FOREIGN PATENT DOCUMENTS

| EP | 0133576 A2 | 2/1985 |
| EP | 1433655 A2 | 6/2004 |
| EP | 1759920 A1 | 3/2007 |
| JP | 2016-162682 A | 9/2016 |
| WO | 02/063206 A2 | 8/2002 |
| WO | 2012/041442 A1 | 4/2012 |

OTHER PUBLICATIONS

International Search Report and Written Opinion for PCT/AT2017/060008, dated Apr. 12, 2017 (14 pages).

* cited by examiner

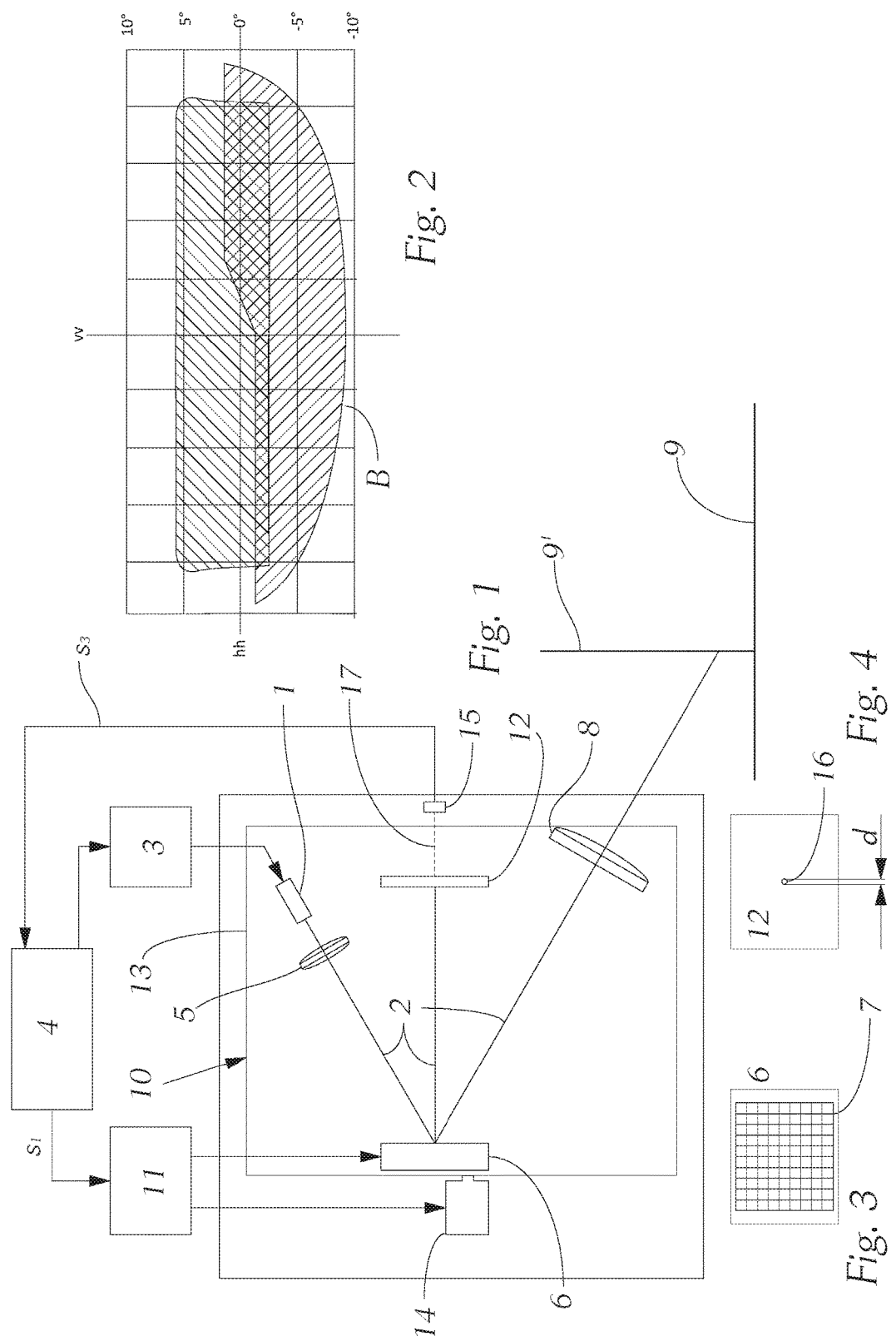

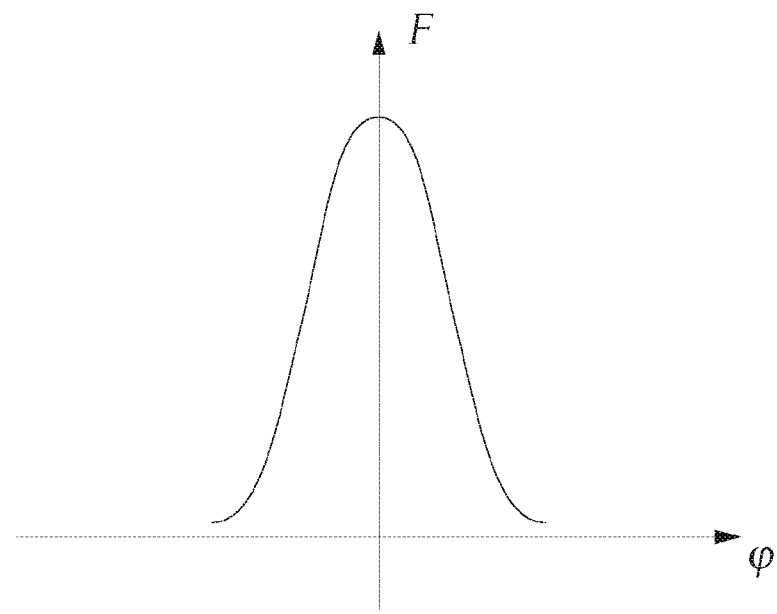
Fig. 5
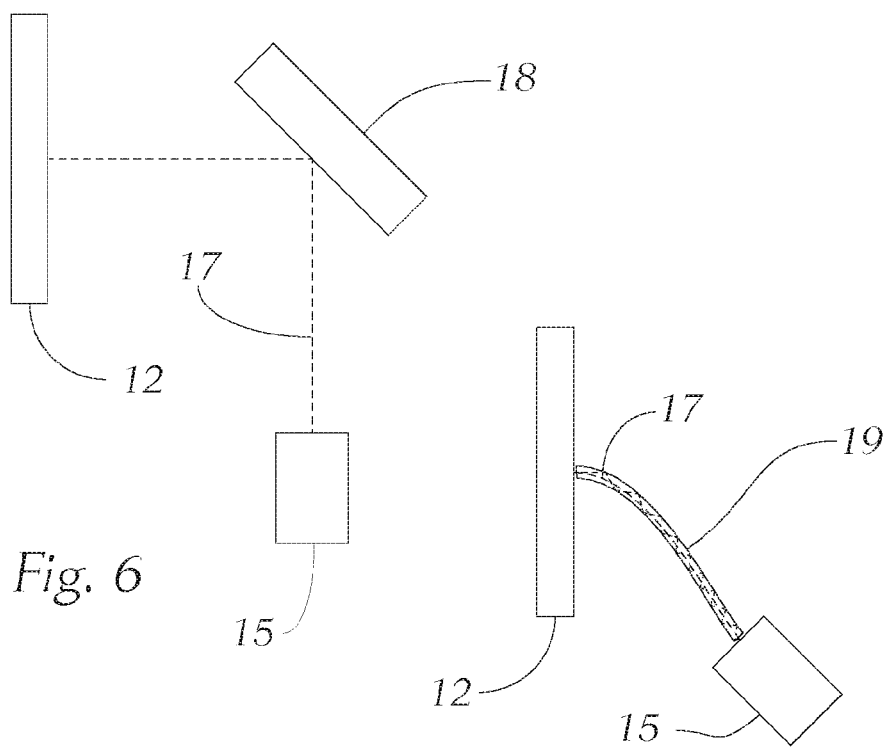
Fig. 6
Fig. 7

METHOD FOR DETERMINING THE ZERO POSITION OF A MIRROR DEVICE OF A VEHICLE HEADLIGHT

The invention relates to a headlamp for vehicles, such as cars, which comprises a light module (or several) having at least one light source and at least one mirror device, wherein an actuating drive is associated with the light module, by means of which actuating drive the light module can be pivoted in order to set an angle position predefined for operation. The invention additionally relates to a method for determining a zero position of an angle position of the light module in a headlamp of the aforementioned type.

Headlamps having mirror devices for deflecting the light and for forming a particular desired light pattern are well known. Such a mirror device may be a simple mirror, which may be flat or curved, or may be implemented as a micromirror array (so-called DLP, Digital Light Processor). In many use scenarios, the mirror devices are combined with the light source and possibly associated optical components in a light module, and the light module is arranged such as to be able to pivot in order to select a desired operating setting, for example for luminous range adjustment. The setting of a desired angle position by pivoting the mirror is achieved by an actuating drive of a type known per se. The problem often arises that, in order to reliably set the angle position of the mirror, it is necessary to know a zero position of the actuating drive.

In conventional solutions, the zero position of the drive motor of the mirror is determined in that the motor is moved against a stop or is moved over a reference position which is queried by means of a mechanical or Hall-effect sensor. However, this enables only a determination of the motor position, with no account being taken of additional geometric influences on the beam course, such as for example tolerances in the positioning of the optical components or a warping of the carrier frame.

It is therefore an object of the invention to overcome the aforementioned disadvantages and to enable reliable identification of the zero position.

For a headlamp of the type mentioned above, this object is achieved according to the invention by an absorber surface having an opening, wherein light which comes from the light source and which impinges on the absorber surface is absorbed at the latter, with the exception of light which passes through the opening as a delimited light beam, and by a light-sensitive sensor which is located behind the opening in the line of sight from the mirror device and which is configured to detect the light beam passing through the opening in order to identify a zero position of the angle position of the light module. Here, "line of sight" is understood to mean an uninterrupted propagation path of a notional light beam, also taking account of any optical elements such as mirrors or lenses which may be present and which can cause the light of sight to deviate from a simple straight line by way of reflection or refraction, but without leading to any notable impairment of the light signal.

As a result of this solution, light can pass through the opening in the absorber surface as a delimited light beam; by means of the actuating drive, the light module is pivoted in terms of the angle position, an intensity of the light beam passing through the opening being detected by means of the light-sensitive sensor. This solution according to the invention enables a reliable calibration and identification of a zero position of the drive motor for the module adjustment. A further advantage is the small number of components that are provided in addition to the actual operating components of the headlamp, since the light source is additionally used for the reference run (dual use of the light source).

In one particularly advantageous use scenario, the light module is pivotable (at least) about a horizontal axis in order to adjust the luminous range.

According to one advantageous further development of the invention, the mirror device may be a micromirror array; by virtue of the latter, during the identification of the zero position, light which is emitted by the light source can be deflected by at least a portion of the micromirror array onto the absorber surface.

To reliably enable the measurement as a function of the angle position, an arrangement may be advantageous in which the absorber surface is arranged in a stationary manner relative to the pivotable light module, for example as a component of the light module, whereas the sensor is arranged independently of the light module, for example is fixedly fitted in the headlamp outside of the light module. Conversely, in a variant, the sensor could be arranged in a stationary manner relative to the pivotable light module, while the absorber surface is arranged independently of the light module, for example is fixedly mounted in the headlamp.

The light beam passing through the opening of the absorber surface may impinge directly on the light-sensitive sensor or may be deflected indirectly onto the latter, namely by an optically active deflecting device. This deflecting device may be, for example, a suitably arranged deflecting mirror, or it may be a light guide that is suitably arranged between the opening of the absorber surface and the light-sensitive sensor. The deflecting device may be positioned within the light module—in particular as a component therein—or outside of the light module, for example in a defined position relative to the sensor.

The light module may be held for example in a carrier frame of the headlamp, wherein the carrier frame has the actuating drive, by means of which the light module can be pivoted in order to set an angle position predefined for operation. Imaging lenses are usually provided in the beam path downstream of the light source and the mirror device, which imaging lenses are preferably part of the light module but may also be mounted in the headlamp independently of the light module.

According to one variant of the invention, the mirror device may be a mirror which is arranged in the beam path between the light source and the micromirror array; alternatively, the mirror may be arranged in the beam path downstream of the micromirror array.

According to the invention, in a method for determining a zero position of an angle position of a light module in a headlamp according to the invention, light coming from the light source is directed onto the absorber surface; the actuating drive can then pivot the light module in terms of its angle position, an intensity of the light beam passing through the opening being detected by means of the light-sensitive sensor.

The zero position is identified for example at that angle position at which a maximum of the light intensity is detected; in other words, due to the angle-dependent measurement, the zero position is determined for that value of the angle at which the maximum of the light intensity occurs (or alternatively another featured point of the angle-dependent curve of the light intensity).

The invention, together with further details and advantages, will be explained in greater detail below with regard to exemplary embodiments which are shown in the appended drawings. The embodiments are intended to illustrate the invention and are not to be interpreted as limiting the invention. In the schematic drawings:

FIG. 1 shows a car headlamp having a micromirror array and a measuring device for referencing the micromirror array, according to one embodiment of the invention, FIG. 2 shows an example of a light pattern that can be produced with the headlamp of FIG. 1;

FIG. 3 shows a view of the micromirror array of the headlamp of FIG. 1;

FIG. 4 shows a view of the light-absorbing surface of an absorber in the headlamp of FIG. 1;

FIG. 5 shows an example of a measurement signal of the measuring device as a function of the angle position of the micromirror array; and FIGS. 6 and 7 show deflecting devices which guide the light to be measured indirectly to the sensor.

A first exemplary embodiment of the invention is explained in greater detail in FIG. 1. The parts which are important for a headlamp according to the invention are shown in particular, it being clear that a car headlamp also contains many other parts which enable the practical use thereof in a motor vehicle, such as in particular a car or a motorcycle. From a lighting point of view, the starting point for the headlamp is a light source 1, which emits a light beam 2 and which is assigned an actuator 3, wherein said actuator 3 serves for supplying power to the light source 1 and for monitoring the latter or for example for controlling the temperature thereof and may also be designed to modulate the intensity of the emitted light beam. In connection with the present invention, "modulating" will be understood to mean that the intensity of the light source can be varied, either in a continuous or pulsed manner, in the context of being switched on and off. In addition, it is also possible for it to be switched on and off for a particular period of time. Use is preferably made of LED light sources which can be operated with high currents—known as "high-power LEDs"—in order to achieve the highest possible luminous flux and thus the highest possible luminance on a DMD chip.

The actuator 3 for its part receives signals from the central control unit 4. It may be fed signals of various type, such as for example switching commands for switching from high beam to low beam or other signals which are received for example from sensors, such as cameras, which sense the lighting conditions, environmental conditions and/or objects on the road. The signals may also come from vehicle-to-vehicle communication information. The control unit 4, shown schematically here as a block, may be arranged outside of the headlamp or may be entirely or partially contained in the headlamp.

A lens 5 may be arranged downstream of the light source 1, the configuration of said lens depending inter alia on the type, number and physical placement of the lighting means used, such as laser diodes or LEDs, and on the required beam quality, and being intended to ensure in particular that the light emitted by the light source impinges as homogeneously as possible on the micromirrors of a micromirror array 6.

FIG. 3 shows a symbolic representation of the micromirror array 6 in a view toward the surface formed by the plurality of micromirrors of the array. As is known, the individual micromirrors of the micromirror array 6 can be tilted in terms of their angle position relative to the incident light beam 2.

With reference once again to FIG. 1, the focused or formed light beam 2 then passes onto said micromirror array 6, on which a light pattern 7 is formed as a result of the corresponding position of the individual micromirrors. The light pattern 7 can then be projected via an imaging lens 8 as a light pattern B onto a road 9. The light pattern B can be made visible and measured for example for control purposes by means of a temporarily positioned screen 9'; one example of such a light pattern B is shown in FIG. 2. The control unit 4 delivers signals $s_1$ to an array controller 11 which controls the individual micromirrors of the array 6 in the manner appropriate for the desired light pattern B. The individual micromirrors of the array 6 can be controlled individually with regard to frequency, phase and deflection angle.

The portions of light that are not deflected by the micromirrors of the array 6 onto the imaging lens 8 (and further outward by the latter) are directed toward an absorber 12 which has a light-absorbing surface facing toward the mirror. The absorber 12 has the function of absorbing the light that is kept away from the array 6, thereby suppressing in particular undesired reflections in the headlamp. The components of the beam path from the light source 1 via the array 6 to the imaging lens 8 and the absorber 12 are advantageously arranged in a light module 10, in which said components are fixedly fitted, which ensures a defined positional relationship of said components—in particular of the light source 1, lens 5, array 6 and absorber 12. Often, but not necessarily, the imaging lens 8 is also contained in the light module 10. The light module 10 may additionally, as shown in the exemplary embodiment, be mounted in a carrier frame 13 which holds the light module 10 and the components thereof and can be pivoted vertically as a whole. The carrier frame 13 or the light module 10 is held by an adjustable holder 14, and preferably can be pivoted at least about a horizontal axis by the actuating drive of the holder 14. The light module 10 can thus be adjusted in its vertical orientation by means of the holder 14; said holder in this way serves for adjusting the luminous range of the headlamp. The actuating drive of the holder 14 may be configured for example as a stepper motor.

The carrier frame 13 forms an "interface" to the headlamp, including the sensor 15, which interface can be adjusted by the movable holder 14. The carrier frame 13 can thus be adapted to the respective headlamp; if necessary, it can also hold other modules which can then also be referenced. It is therefore generally necessary to adapt the holder/adjustment unit 14 to the present situation in the headlamp in order to satisfy the respective geometry and optionally the occurring forces. It is thus generally necessary to calibrate the vertical orientation of the light module 10, and thus the position of the drive of the holder 14. This is usually necessary in particular in the case of a drive implemented by a stepper motor, especially since a stepper motor is often actuated only incrementally. For the calibration, a reference run is carried out, by which the positioning of the holder—and the luminous range adjustment—is ascertained. In this way, a zero position can be determined or defined, and then the deflections of the drive or increments of the stepper motor are counted starting from this position, in order to identify the present position of the drive/stepper motor.

According to the invention, the measurement of the position in the reference run takes place by means of a light-sensitive sensor 15 which, as seen from the micromirror array 6, is arranged behind the absorber 12 and is mounted in such a way that the position thereof is not influenced by a movement of the light module 10 by the actuating drive of the holder 14. By way of example, the sensor 15 is mounted in the headlamp independently of the carrier frame 13, preferably outside of the carrier frame.

Formed in the absorber 12 is an opening 16 (FIG. 4), through which a portion of the light directed onto the absorber can pass in the form of a delimited light beam 17. This light is detected by the sensor 15, which is configured for example as a photodiode, and a corresponding detection signal s3 is fed to the control unit 4, in which the evaluation and identification of the zero position is carried out. The zero position is identified as a result of the light that passes through impinging on the sensor 15, whereas no impinging light (or only a small amount) is detected in the other positions of the drive of the sensor.

With reference to FIG. 4, the opening 16 is formed in the absorber 12, or more precisely in the light-absorbing surface thereof, at a location corresponding to the position of the drive in the zero position, in order to make it possible to define the zero position. The opening 16 is for example circular or square. The diameter d of the opening 16 is selected to be large enough to allow a sufficient luminous flux to pass through for detection by the sensor. As long as this is achieved, however, preference is given to a small diameter d, for example less than 1 mm; this is advantageous in order to keep the beam 17 tight so that a light/dark transition that can easily be identified by the sensor can be achieved during the reference run.

The reference run is carried out and monitored by the control unit 4. During a reference run, the micromirror array 6 is switched to dark, so that all of the light is directed onto the absorber surface. Light thus passes through the opening 16 and is detected by the sensor 15. FIG. 5 shows an example of a detection signal F as a function of the angle position φ of the array 6. The holder pivots the array 6 until the sensor 15 detects a flank or peak of the signal F. The position of the flank or the mid-position of the peak is then stored as reference value and used as the zero position for the further movement operations.

With reference to FIGS. 6 and 7, it may not be possible or may not be advisable—for example for reasons of space—to place the sensor 15 in the line of sight of the opening 16. In such a case, a deflecting optical system (a deflecting device) may direct the light 17 passing through the opening toward the sensor 15. The deflecting optical system may be implemented for example by reflector surfaces, for example a mirror 18 and/or optical fibers 19. Of course, other embodiments of the deflecting device are also possible, which may include deflecting mirrors, light guides and/or further optical components.

The inventive arrangement of the sensor enables a reliable calibration and identification of a zero position of the drive motor for the mirror adjustment, with a small number of components that must be included for identifying the zero position. In particular, the dual use of the light source must be emphasized here, since said light source is used not only for its actual function but additionally also for the reference run.

A further advantage lies in the fact that the reference run can be carried out more quickly because the distances to be travelled by the drive motor are smaller than in conventional solutions.

By determining the angle position instead of the position of the motor as in conventional solutions, the invention makes it possible to omit the need for additional sensors for the drive motor. Furthermore, the invention makes it possible to take account implicitly of manufacturing tolerances, such as for example a warping of the carrier frame, whereas these had to be taken into account separately in conventional solutions.

The invention claimed is:

1. A headlamp for vehicles, comprising:
   at least one light module (10) having at least one light source (1) and at least one mirror device (6);
   an actuating drive (14) associated with the at least one light module (10), the actuating drive being configured to pivot the light module (10) in order to set an angle position predefined for operation;
   an absorber surface (12) having an opening, wherein light coming from the at least one light source (1) and impinging on the absorber surface (12) is absorbed at the latter, with the exception of light which passes through the opening (16) as a delimited light beam (17); and
   a light-sensitive sensor (15) which is located behind the opening (16) in the line of sight from the mirror device (6) and which is configured to detect the light beam (17) passing through the opening for identifying a zero position of the angle position of the at least one light module (10).

2. The headlamp of claim 1, wherein the at least one light module (10) is pivotable about a horizontal axis in order to adjust the luminous range.

3. The headlamp of claim 1, wherein the mirror device is a micromirror array (6), wherein the micromirror array (6) is configured to deflect during the identification of the zero position, light which is emitted by the at least one light source (1) by at least a portion of the micromirror array (6) onto the absorber surface (12).

4. The headlamp of claim 1, wherein the absorber surface (12) is arranged in a stationary manner relative to the pivotable at least one light module, whereas the light-sensitive sensor (15) is arranged independently of the at least one light module (10).

5. The headlamp of claim 4, comprising an optically active deflecting device (18, 19) configured to direct the light beam (17) passing through the opening (16) of the absorber surface (12) onto the light-sensitive sensor (15).

6. The headlamp of claim 5, wherein the optically active deflecting device is a deflecting mirror (18).

7. The headlamp of claim 5, wherein the optically active deflecting device is a light guide (19) located between the opening (16) and the light-sensitive sensor (15).

8. The headlamp of claim 1, wherein the light module (10) is held in a carrier frame (13) of the headlamp, wherein the carrier frame (13) comprises the actuating drive (14), by means of which the light module (10) can be pivoted in order to set an angle position predefined for operation.

9. A method for determining a zero position of an angle position of a light module (10) in a headlamp, wherein the headlight comprises at least one light module having at least one light source (1) and at least one mirror device (6), the method comprising:
   directing light coming from the at least one light source (1) onto an absorber surface (12);
   using an actuating drive (14) to pivot the at least one light module (10) in terms of its angle position in order to set an angle position predefined for operation; and
   detecting an intensity of a light beam (17) from the at least one light source passing through an opening (16) in the absorber surface, the detecting being by means of a light-sensitive sensor (15) which is located behind the opening (16) in the line of sight from the at least one mirror device (6); and
   using the detected intensity to identify a zero position of the angle position of the at least one light module (10).

10. The method of claim 9, wherein the zero position is identified at an angle position of the at least one light module (10) where a maximum of the light intensity is detected.

11. The headlamp of claim 1, wherein the absorber surface (12) is a component of the at least one light module (10), and the light-sensitive sensor (15) is fixedly fitted in the headlamp outside of the at least one light module (10).

12. The headlamp of claim 4, wherein the deflecting device is arranged outside of the at least one light module.

* * * * *